(12) United States Patent
Kapoor et al.

(10) Patent No.: US 8,111,611 B2
(45) Date of Patent: Feb. 7, 2012

(54) BIDIRECTIONAL FORWARDING DETECTION ON MULTILINK BUNDLED INTERFACES

(75) Inventors: Hitesh Kapoor, Fremont, CA (US);
Puneet Gupta, Sunnyvale, CA (US);
Rajan Narayanan, San Jose, CA (US);
David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 12/164,290

(22) Filed: Jun. 30, 2008

(65) Prior Publication Data
US 2009/0323520 A1    Dec. 31, 2009

(51) Int. Cl.
*H04J 3/14* (2006.01)
(52) U.S. Cl. ......... 370/216; 370/242; 370/419; 370/536
(58) Field of Classification Search .................. 370/225, 370/352, 401, 216, 218, 242, 419, 536
See application file for complete search history.

(56) References Cited

U.S. PATENT DOCUMENTS

| | | | | |
|---|---|---|---|---|
| 2005/0078690 | A1* | 4/2005 | DeLangis | 370/401 |
| 2007/0207591 | A1* | 9/2007 | Rahman et al. | 438/439 |
| 2008/0247324 | A1* | 10/2008 | Nadeau et al. | 370/245 |
| 2009/0046579 | A1* | 2/2009 | Lu et al. | 370/225 |

OTHER PUBLICATIONS

Sklower et al., "The PPP Multilink Protocol (MP)," RFC 1990, The Internet Society, Aug. 1996, 24 pages.
"Bundling NxE1 Links With a Multilink Interface," Cisco Systems, Inc. Document ID: 11044, Aug. 2005, 25 pages.
"Alternatives for High Bandwidth Connections Using Parallel T1/E1 Links," Cisco Systems, Inc., 1998, 8 pages.
Ruby, "Multilink WAN Service Solutions for Bandwidth Demands," Quick Eagle Networks, Sunnyvale, CA, 2000, 10 pages.
Walsh, Multilink Frame Relay: FRF.15 & FRF.16, Frame Relay Forum, Fremont, CA, 22 pages.
D. Katz and D. Ward, "Bidirectional Forwarding Detection," draft-katz-ward-bfd-02.txt, The Internet Society, May 2004 (29 pages).

* cited by examiner

*Primary Examiner* — Kevin C Harper
*Assistant Examiner* — Wanda Russell
(74) *Attorney, Agent, or Firm* — The Law Office of Kirk D. Williams

(57) ABSTRACT

Disclosed are, inter alia, methods, apparatus, computer-storage media, mechanisms, and means associated with Bidirectional Forwarding Detection (BFD) on multilink bundled interfaces. A packet switching device communicates with another packet switching device through a multilink bundled interface configured for communicating over a plurality of bundled communication links. A separate BFD session is conducted over each link of the multiple bundled communication links, and in response to a BFD-detected failure condition, the use of the one or more links or the entire bundled interface is removed from service.

23 Claims, 6 Drawing Sheets

BIDIRECTIONAL FORWARDING DETECTION ON MULTILINK BUNDLED INTERFACES

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity. Data communication connections at link speeds of 1.544 Mbit/s (T1) or 2.048 Mbit/s (E1) are widely available from service providers today. As enterprise networks and their connection to the global Internet become more a business critical resource, the bandwidth requirements may grow beyond the capacity of a single T1 or E1 link. If a single connection at T1/E1 speed is not sufficient to satisfy the bandwidth requirements, ready solutions are not always available. Upgrading the link to higher speeds is often not possible as the next level in the digital transmission hierarchy is at 45 Mbps (T3) or 34 Mbps (E3) link speeds. In many cases, these lines are prohibitively expensive or may not even be available. Even if the lines are available, the required bandwidth may be far below T3/E3 speeds and the link would be underutilized. Unless the telecommunications carrier is offering specific leased line services at speeds between T1/E1 and T3/E3, which is rare, upgrading the link is often economically not feasible. Hence, multilink bundled services such as Multilink Point-to-Point Protocol (MLPPP) and Multilink Frame Relay are being offered which aggregate multiple slower rate links and provide a logical appearance as a single, faster rate service.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1A:
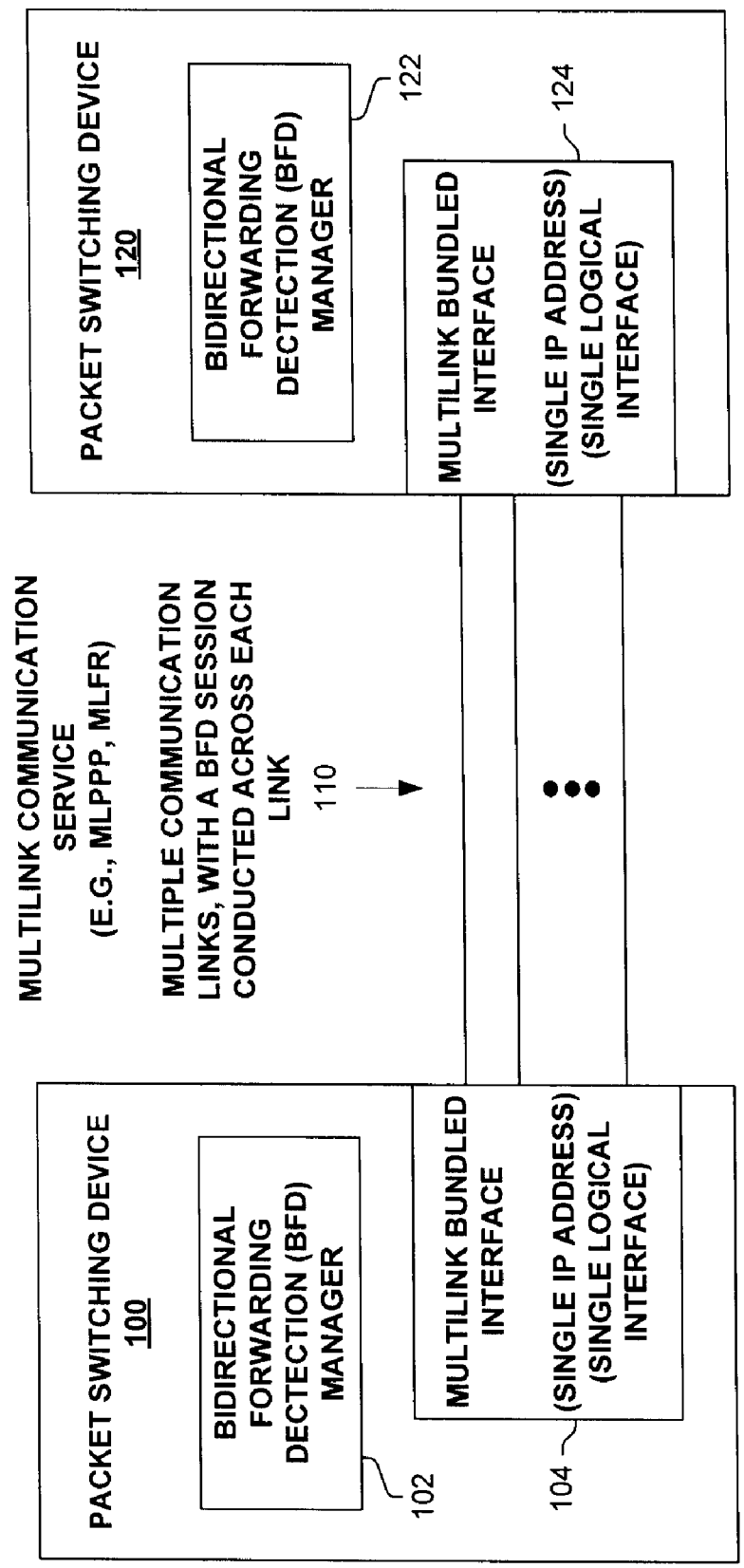
FIG. 1A illustrates an example network operating according to one embodiment.

Disclosed are, inter alia, methods, apparatus, computer-storage media, mechanisms, and means associated with Bidirectional Forwarding Detection (BFD) on multilink bundled interfaces. One embodiment communicates with a destination through a multilink bundled interface configured for communicating over a plurality of bundled communication links; conducts a separate Bidirectional Forwarding Detection (BFD) session with the destination over each link of the plurality of bundled communication links; and causes a particular link to be removed from the plurality of bundled communication links in response to detecting a failure with said particular link based on its said BFD session. One embodiment also performs link layer failure detection on each of the plurality of bundled communication links. One embodiment removes the multilink bundled interface from service in response to said detecting a failure based on a said BFD session of at least a predetermined number of the plurality of bundled communication links, such as, but not limited to a predetermined number of one through the number of aggregated links. In one embodiment, the plurality of bundled communication links are provided by Multilink Point-to-Point Protocol (Multilink PPP) or Multilink Frame Relay.

2. Description

Disclosed are, inter alia, methods, apparatus, computer-storage media, mechanisms, and means associated with Bidirectional Forwarding Detection (BFD) on multilink bundled interfaces. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Computer-readable media and means for performing methods and processing block operations are disclosed and are in keeping with the extensible scope and spirit of the invention. Nothing described or referenced in this document is admitted as prior art to this application unless explicitly so stated.

The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with Bidirectional Forwarding Detection (BFD) on multilink bundled interfaces. One embodiment includes: 1. An apparatus, comprising: a multilink bundled interface configured for communicating over a plurality of bundled communication links with a same destination, wherein said configuration includes distributing packets over the plurality of bundled communication links; a Bidirectional Forwarding Detection (BFD) manager configured to conduct a separate BFD session over each link of the plurality of bundled communication links, and a bundle manager configured to cause a particular link to be removed from the plurality of bundled communication links in response to detecting a failure with the particular link based on its said BFD session.

In one embodiment, the multilink bundled interface operates at the link layer and appears to upper layer protocols as a single logical link. In one embodiment, the multilink bundled interface is assigned a single Internet Protocol (IP) address for use as the source address for IP packets to be sent from the multilink bundled interface and for use as a destination address of IP packets to be received on the multilink bundled interface. In one embodiment, the multilink bundled interface is configured to perform link layer failure detection and to remove a link from the plurality of bundled communication links in response to a detected link layer failure of the link. In one embodiment, the bundle manager is configured to cause the multilink bundled interface to be removed from service in response to said detecting a failure based on a said BFD session, of at least a predetermined number of the plurality of bundled communication links. In one embodiment, the predetermined number is greater than one. In one embodiment, the plurality of bundled communication links are provided by Multilink Point-to-Point Protocol (Multilink PPP) or Multilink Frame Relay.

One embodiment includes an apparatus, comprising: an interface configured for communicating over a communication link with a device running a plurality of Bidirectional Forwarding Detection (BFD) sessions with said apparatus on the communication link; and a BFD manager configured to: conduct a separate BFD session over the communication link for each of the plurality of BFD sessions; wherein the device and the apparatus each communicate with an intermediate device; and wherein the device communicates with the intermediate device over a plurality of bundled communication links with a different one of the plurality of BFD sessions being conducted over each of the plurality of bundled communication links.

In one embodiment, the apparatus is configured to remove the communication link from service in response to detecting a failure on more than one BFD session in the plurality of the BFD sessions. In one embodiment, the apparatus is configured to remove the communication link from service in response to detecting a failure on all of the plurality of the BFD sessions. In one embodiment, the apparatus is configured to leave the communication link in service in response to detecting a failure on less than all of the plurality of the BFD sessions. In one embodiment, the interface is configured to perform link layer failure detection on the communication link and to remove the communication link from service to a detected link layer failure of the link.

One embodiment performs operations comprising: communicating with a destination through a multilink bundled interface configured for communicating over a plurality of bundled communication links; conducting a separate Bidirectional Forwarding Detection (BFD) session with the destination over each link of the plurality of bundled communication links; and causing a particular link to be removed from the plurality of bundled communication links in response to detecting a failure with said particular link based on its said BFD session.

One embodiment performs link layer failure detection on each of the plurality of bundled communication links. One embodiment removes the multilink bundled interface from service in response to said detecting a failure based on a said BFD session of at least a predetermined number of the plurality of bundled communication links greater than one. In one embodiment, the plurality of bundled communication links are provided by Multilink Point-to-Point Protocol (Multilink PPP) or Multilink Frame Relay.

One embodiment includes: means for communicating with a destination through a multilink bundled interface configured for communicating over a plurality of bundled communication links; means for conducting a separate Bidirectional Forwarding Detection (BFD) session with the destination over each link of the plurality of bundled communication links; and means for causing a particular link to be removed from the plurality of bundled communication links in response to detecting a failure with said particular link based on its said BFD session. One embodiment includes means for performing link layer failure detection on each of the plurality of bundled communication links.

One embodiment performs operations including: communicating with a destination through a single communication link; and conducting a plurality of Bidirectional Forwarding Detection (BFD) sessions with the destination over the single communication link; wherein the device and the apparatus each communicate with an intermediate device; and wherein the device communicates with the intermediate device over a plurality of bundled communication links with a different one of the plurality of BFD sessions being conducted over each of the plurality of bundled communication links.

One embodiment includes: means for communicating with a destination through a single communication link; and means for conducting a plurality of Bidirectional Forwarding Detection (BFD) sessions with the destination over the single communication link; wherein the device and the apparatus each communicate with an intermediate device; and wherein the device communicates with the intermediate device over a plurality of bundled communication links with a different one of the plurality of BFD sessions being conducted over each of the plurality of bundled communication links.

Expressly turning to the figures, FIG. 1A illustrates two packet switching devices 100 and 120 communicating with each other over multilink communication service 110, such as, but not limited to Multilink Point-to-Point Protocol (MLPPP), Multilink Frame Relay (MLFR), bit-based multiplexing, etc. Multilink communication service 110 includes multiple communication links that make up a single logical interface and is assigned a single Internet Protocol (IP) address, which allows packets be routed over any of multiple communication links of the multilink communication service using a same IP address (rather than a different IP address for each individual interface of the bundled interface). By conducting a separate Bidirectional Forwarding Detection (BFD) session over each of the communication links in the multilink bundled communication service, the communicative integrity of each link can be monitored and quickly taken out of service in response to a detected failure condition, and either leaving the remaining links up or taking down the entire interface/all communication links. Using a single BFD session to monitor the bundled communication links would not be as effective as monitoring all communication links, as there may be a problem on one or more of the individual links that is not detected with the single BFD session approach.

Packet switching device 100 includes BFD manager 102 configured to establish and conduct BFD sessions, such as with packet switching device 120 over each of the multiple communication links of multilink communication service 110. Multilink bundled interface 104 of packet switching device 100 presents a single IP address or single logical interface for the multilink communication service 110, and provides for the bundling of the multiple communication links (110), and for taking the entire bundle 110, or individual communication links thereof, in and out of service. Each BFD session is typically distinguishable based on a value inserted in the BFD discriminator field by BFD manager 102, which informs multilink bundled interface 104 of which link of multiple links 110 to use to send the corresponding packet, and informs BFD manager 122 of packet switching device 120 to which session the BFD information corresponds.

Similarly, packet switching device 120 includes BFD manager 122 configured to establish and conduct BFD sessions, such as with packet switching device 100 over each of the multiple communication links of multilink communication service 110. Multilink bundled interface 124 of packet switching device 120 presents a single IP address or single logical interface for the multilink communication service 110, and provides for the bundling of the multiple communication links (110), and for taking the entire bundle 110, or individual communication links thereof, in and out of service. Each BFD session is typically distinguishable based on a value inserted in the BFD discriminator field by BFD manager 122, which informs multilink bundled interface 124 of which link of multiple links 110 over which to send the corresponding packet, and informs BFD manager 102 of packet switching device 100 to which session the BFD information corresponds.

Figure 1B:
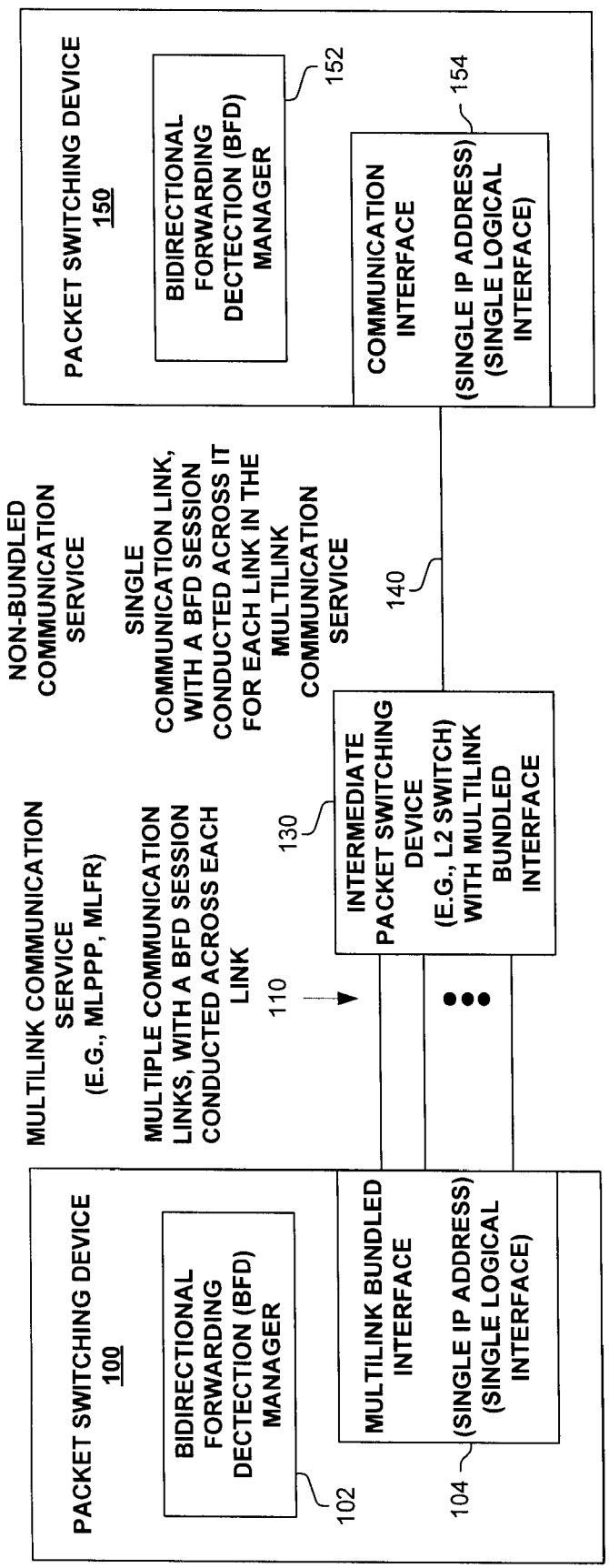
FIG. 1B illustrates an example network operating according to one embodiment.

FIG. 1B illustrates a second configuration (with corresponding numbered components described in relation to FIG. 1A) using one or more embodiments, wherein there is an intermediate device 130 (e.g., a Layer 2 packet switch) between packet switching devices 100 and 150 conducting the BFD sessions between them, and the multilink communications service 110 is between packet switching device 100 and intermediate device 130. Packet switching device 150 includes a BFD manager 152 to establish and conduct BFD sessions and a communication interface 154 configured for communicating with intermediate packet switching device 130 over a non-bundled communication service 140 (e.g., a single link). Each BFD session is typically is distinguishable based on a value inserted in the BFD discriminator field by BFD manager 152, which informs intermediate packet switching device 130 and BFD manager 102 of packet switching device 100 to which session the BFD information corresponds.

In this example, intermediate packet switching device 130 does not terminate a BFD session, but rather forwards packets corresponding to the BFD sessions to the respective packet switching device 100 or 150. In one embodiment, packet switching device 100, aware that multiple communication links 110 are bundled by multilink bundle interface 104, establishes a separate BFD session over each of the communication links 110 with packet switching device 150, even though all of the packets with the separate BFD information will be received on, and sent from, a single communication interface 154 of packet switching device 150 (of which topology, packet switching device may or may not be aware). For packets with BFD information going from packet switching device 100 to 150, intermediate packet switching device 130 simply forwards all packets over link 140. For packets with BFD information going from packet switching device 150 to 100, intermediate packet switching device 130 identifies which link 110 of the bundled links over which to forward each packet, such as based on a value in the BFD discriminator field inserted by packet switching device 150 into each packet carrying BFD information.

Figure 2:
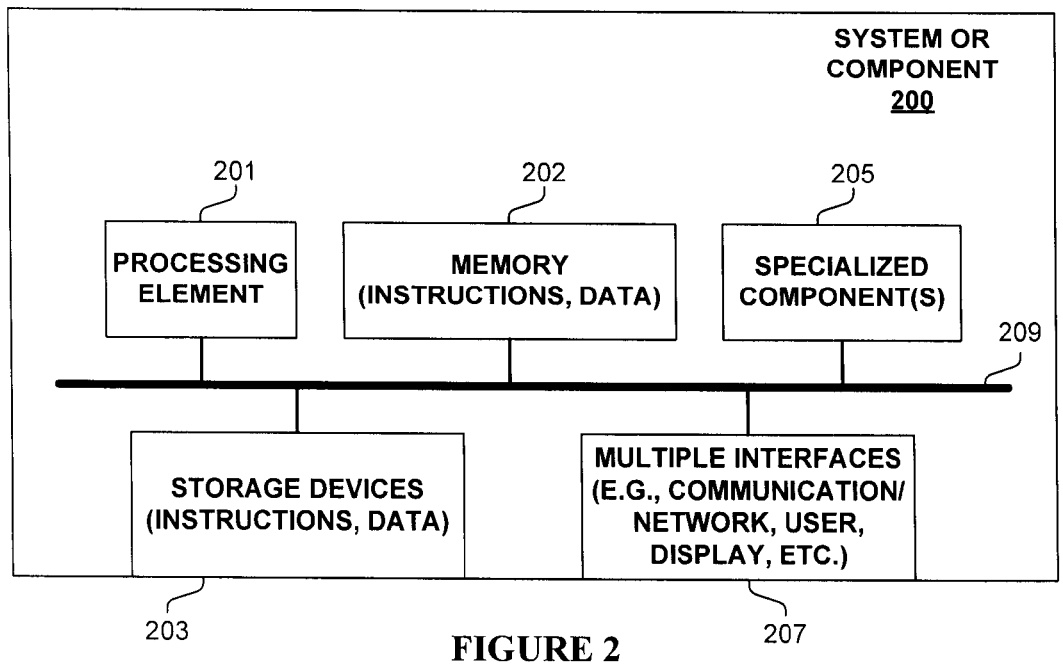
FIG. 2 illustrates an example system or component used in one embodiment.

FIG. 2 is block diagram of a system or component 200 used in one embodiment performing Bidirectional Forwarding Detection (BFD) on each link associated with a multilink bundled interface. In one embodiment, system or component 200 performs one or more processes corresponding to one of the flow diagrams illustrated or otherwise described herein.

In one embodiment, system or component 200 includes a processing element 201, memory 202, storage devices 203, specialized components 205 (e.g. optimized hardware such as for performing classification operations for identifying packets with BFD information, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
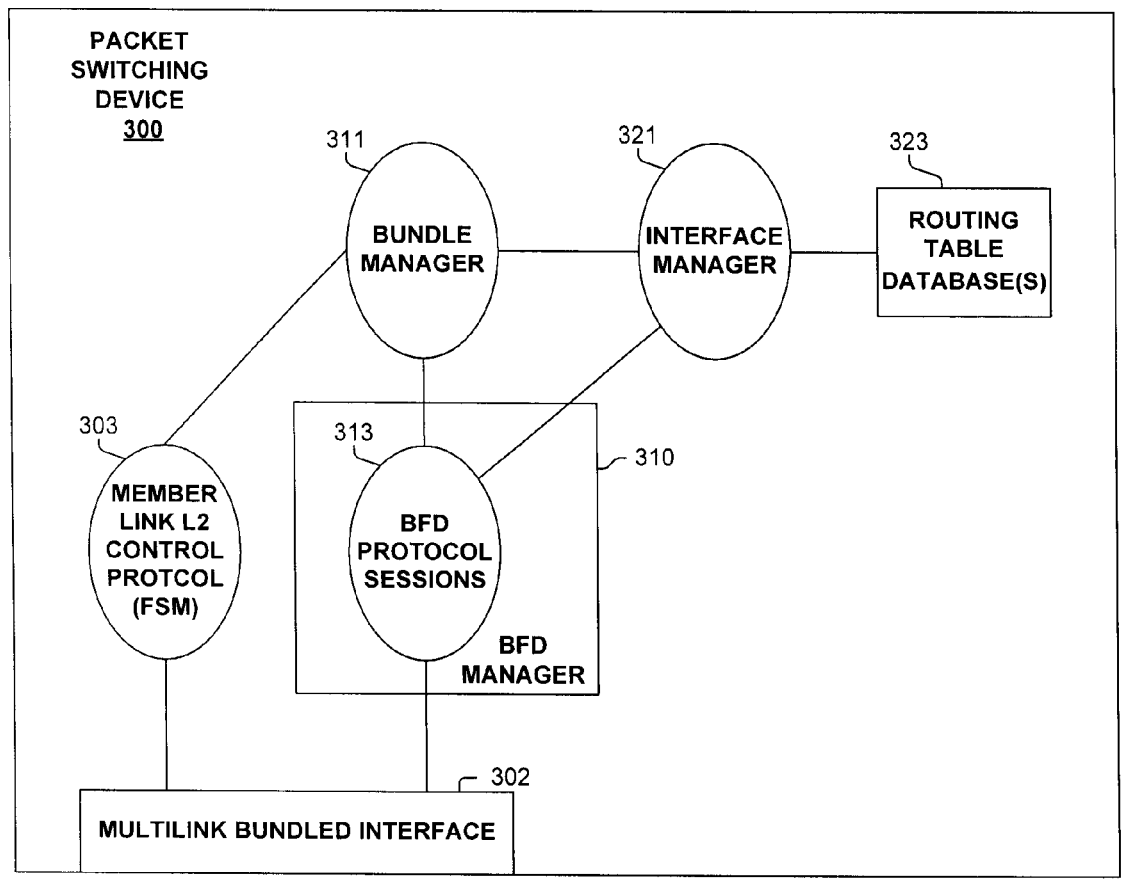
FIG. 3 illustrates an example packet switching device operating according to one embodiment.

FIG. 3 illustrates a software architecture used in one embodiment of a packet switching device 300 performing Bidirectional Forwarding Detection (BFD) on each link associated with a multilink bundled interface 302. In one embodiment, multilink bundled interface 302 represents a single logical interface, which possibly may be assigned a single IP address, for communicating over a plurality of links of a bundled communication service. In one embodiment, multilink bundled interface 302 represents multiple interfaces (e.g., multiple virtual interfaces or sub-interfaces) for communicating over multiple links of a bundled communication service.

Member link L2 (link layer) control protocol process(es) (e.g., implemented finite state machine) 303 is configured to perform link layer failure detection on the communication link, and to remove the communication link from service in response to a detected link layer failure of the link or in response to a command issued by Bundle Manager 311. In one embodiment, BFD manager 310 includes BFD protocol sessions process(es) 313 configured to establish and conduct the BFD sessions and error detection with another packet switching device. (Note, in one embodiment, BFD manager 310 includes bundle manager 311, member link control protocol 303, and/or interface manager 321.) In one embodiment, BFD bundle manager 311 is configured to communicate with member link L2 control protocol process(es) 303, including communicating commands to take links out of service in response to BFD-detected error conditions as well as receiving status information about links in or added to the bundled communication links. In one embodiment, interface manager process(es) 321 is configured to maintain routing information stored in routing table database(s) 323 used for forwarding packets, including maintaining this information based on BFD and/or link layer detected faults.

The following is an example set of operations performed in one embodiment. BFD Protocol Sessions 313 sends and receives BFD information in packets in order to verify the integrity of communication with other devices and to quickly identify and react to a BFD-detected error condition. In response to such a BFD-detected error condition in one or more of the bundled links, BFD protocol sessions 313 notifies bundle manager 311; while member link L2 control protocol 303 continues to send and receive L2 control packets (which may detect a corresponding error, but typically after a much longer time duration than that by BFD protocol sessions 313). Member link L2 control protocol 303 notifies the status of the bundled links to bundle manager 311. In response to a desired change in the use (e.g., remove or add to service) of individual links in the bundle of communication links, bundle manager 311 notifies interface manager 321, which correspondingly updates one or more routing table databases 323 (thus, stopping or starting packet traffic from being sent to multilink bundled interface 302 for sending from packet switching device 300). Whenever a link of the bundle becomes active again, interface manager 321 will notify BFD protocol sessions 313 to establish and maintain a corresponding BFD session with a remote packet switching device.

Figure 4:
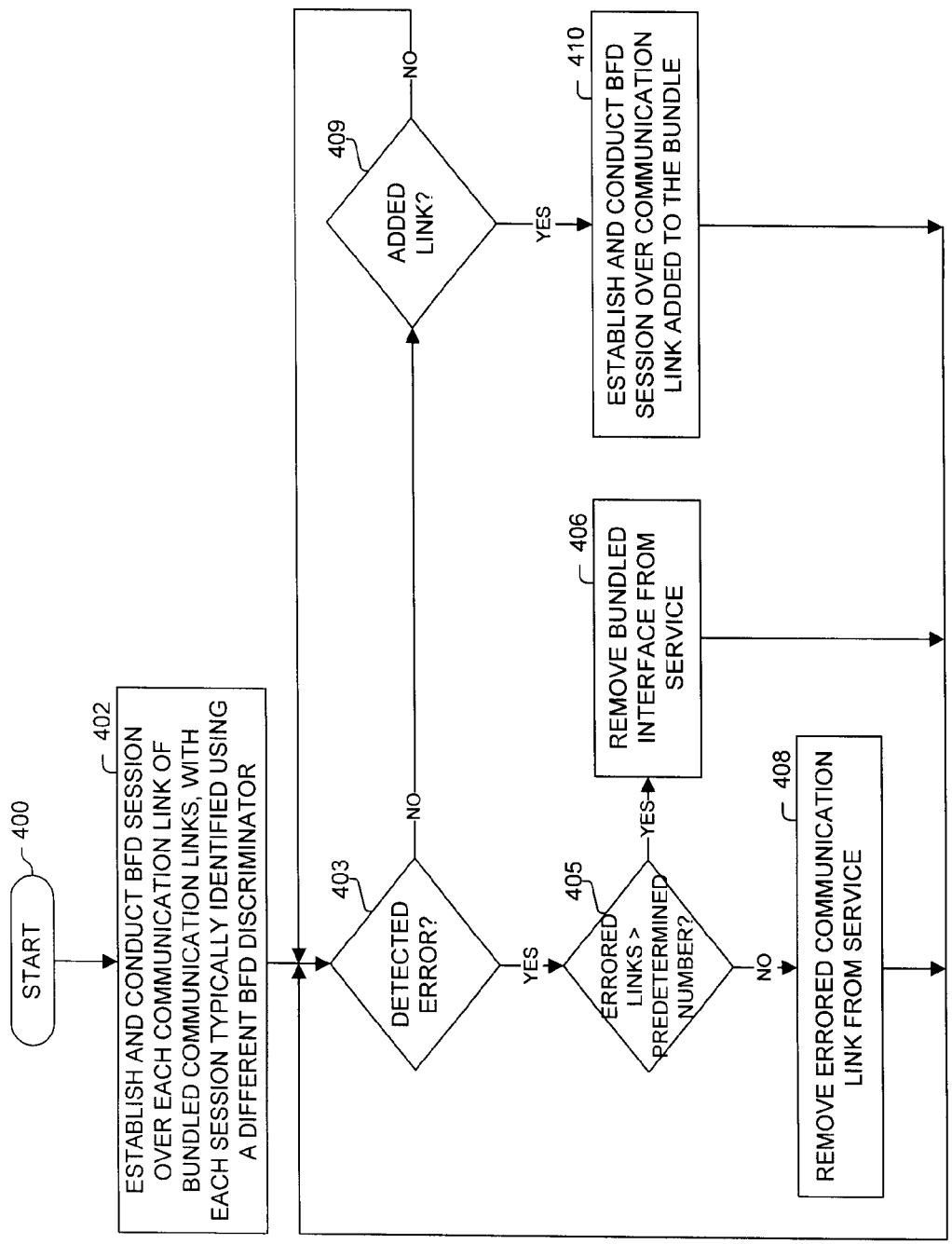
FIG. 4 illustrates a process performed in one embodiment.

FIG. 4 illustrates a process performed by a packet switching device in one embodiment. Processing begins with process block 400. In process block 402, a BFD session is established and conducted over each communication link of the bundled communication links, with each BFD session typically being identified by a different BFD discriminator. As determined in process block 403, when an error is detected based on one or more BFD sessions, then as determined in process block 405, if the number of errored communication links in the bundle is greater than a predetermined number (e.g., zero to one less than the number of communication links), then in process block 406, the entire bundled link interface is removed from service (typically including updating one or more routing or forwarding databases); otherwise, in process block 408, the failed communication link(s) are individually removed from service while leaving the multilink bundled interface in service (as there is at least one link remaining in service and is configured to keep the multilink bundled interface in service with at least a minimal number of communication links). Otherwise, as determined in process block 409, if a communication link has been added to the bundle (e.g., newly placed in service and possibly newly added to the bundle of communication links), then in process block 410, a BFD session is established and conducted over the communication link(s) newly added to the bundle. Processing returns to process block 403.

Figure 5:
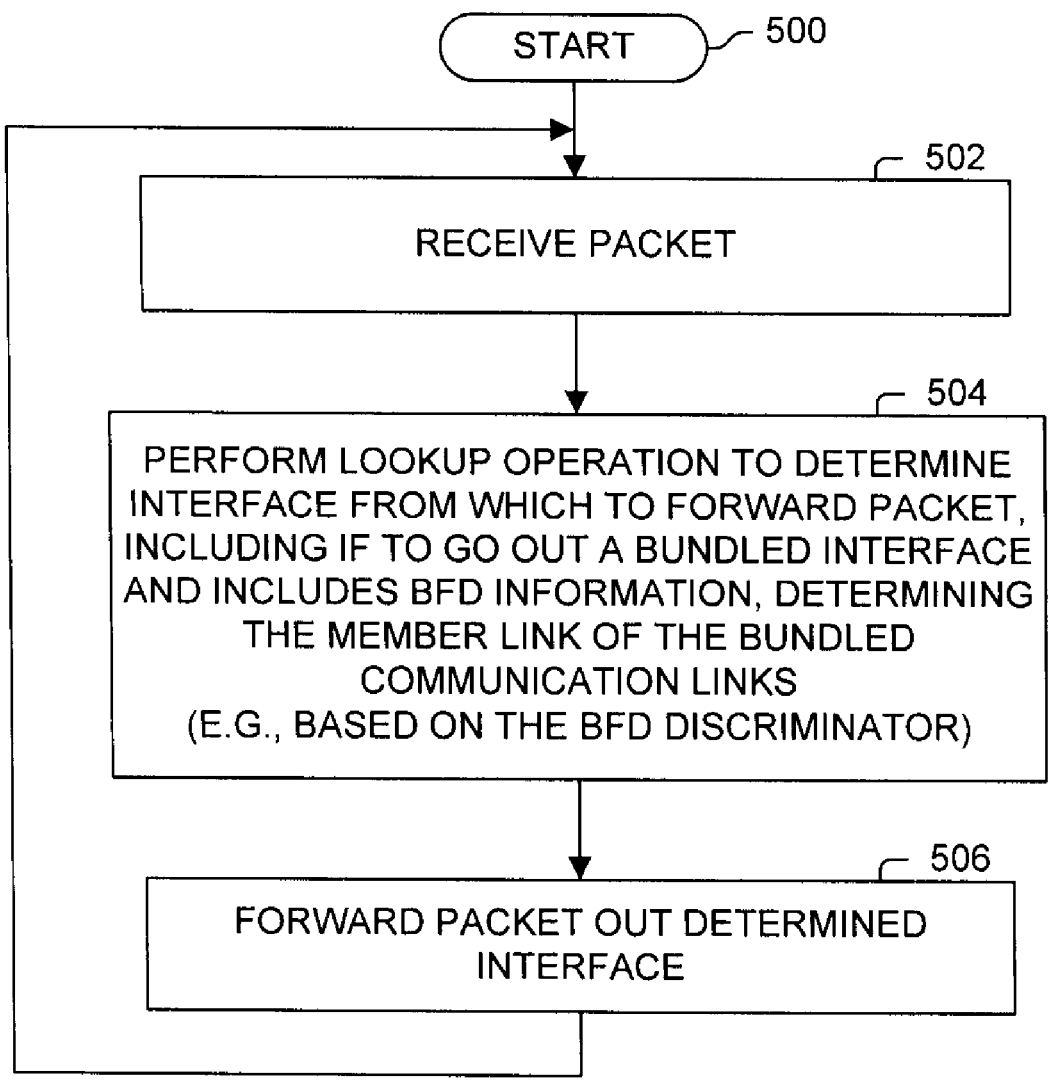
FIG. 5 illustrates a process performed in one embodiment.

FIG. 5 illustrates a process performed by an intermediate packet switch in one embodiment. Processing begins with process block 500. In process block 502, a packet is received. In process block 504, a determination is made, typically based on a lookup operation, of which interface from which to forward the packet. If the packet is to be sent out a bundled interface and the packet includes BFD information, then the specific interface (i.e., corresponding communication link of the multilink bundled service) of the bundled interface is identified, typically based on the BFD discriminator or in another manner. In process block 506, the packet is then forwarded out this determined interface. Processing returns to process block 502 to process more packets.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
 a multilink bundled interface configured for communicating over each link of a plurality of bundled communication links between the apparatus and a destination device while appearing as a single logical link to upper layer protocols of the apparatus for communicating with the destination device with a bandwidth corresponding to an aggregate of the bandwidth of each of the plurality of bundled communications links;
 a Bidirectional Forwarding Detection (BFD) manager configured to conduct a separate BFD session over each link of the plurality of bundled communication links between the apparatus and the destination device; and
 a bundle manager configured to cause a particular link to be removed from the plurality of bundled communication links in response to detecting a failure with the particular link based on its said BFD session.

2. The apparatus of claim 1, wherein the multilink bundled interface is assigned a single Internet Protocol (IP) address for use as the source address for IP packets to be sent from the multilink bundled interface and for use as a destination address of IP packets to be received on the multilink bundled interface.

3. The apparatus of claim 1, wherein the multilink bundled interface is configured to perform link layer failure detection and to remove a link from the plurality of bundled communication links in response to a detected link layer failure of the link.

4. The apparatus of claim 1, wherein the bundle manager is configured to cause the multilink bundled interface to be removed from service in response to said detecting a failure based on a said BFD session, of at least a predetermined number of the plurality of bundled communication links.

5. The apparatus of claim 4, wherein the predetermined number is greater than one.

6. The apparatus of claim 1, wherein the plurality of bundled communication links are provided by Multilink Point-to-Point Protocol (Multilink PPP) or Multilink Frame Relay.

7. The apparatus of claim 1, wherein the BFD manager is configured to conduct the separate BFD session over each link of the plurality of bundled communication links between the apparatus and the destination device through the multilink bundle interface.

8. A method, comprising:
communicating, by a first device, with a destination device through a multilink bundled interface configured for communicating over a plurality of bundled communication links; wherein the multilink bundled interface appears as a single logical link to upper layer protocols of the first device for communicating with the destination device with a bandwidth corresponding to an aggregate of the bandwidth of each of the plurality of bundled communications links;
conducting, by the first device, a separate Bidirectional Forwarding Detection (BFD) session with the destination device over each link of the plurality of bundled communication links; and
causing, by the first device, a particular link to be removed from the plurality of bundled communication links in response to detecting a failure with the particular link based on its said BFD session.

9. The method of claim 8, comprising: performing link layer failure detection on each of the plurality of bundled communication links.

10. The method of claim 8, comprising: removing the multilink bundled interface from service in response to said detecting a failure based on a said BFD session of at least a predetermined number of the plurality of bundled communication links greater than one.

11. The method of claim 8, wherein the plurality of bundled communication links are provided by Multilink Point-to-Point Protocol (Multilink PPP) or Multilink Frame Relay.

12. The method of claim 8, wherein the separate Bidirectional Forwarding Detection (BFD) session with the destination device over each link of the plurality of bundled communication links are conducted through the multilink bundle interface.

13. A method, comprising:
communicating, by a first device, with a destination device through an intermediate device; wherein the first device communicates with the intermediate device over a single communication link; and wherein the intermediate device and the destination device communicate with each other over a plurality of bundled communication links terminated with a bundled interface, appearing as a single logical link to upper layer protocols, on each of the intermediate device and the destination device; and
conducting, between the first device and the destination device, a plurality of Bidirectional Forwarding Detection (BFD) sessions over the single communication link, and such that a different one of the plurality of BFD sessions are conducted over each of the plurality of bundled communication links.

14. The method of claim 13 comprising: performing link layer failure detection on each of the plurality of bundled communication links.

15. The method of claim 13 comprising: removing, by the first device, the single communication link from service in response to detecting a failure based on at least a predetermined number greater than one of the plurality of BFD sessions.

16. The method of claim 13, wherein the plurality of bundled communication links are provided by Multilink Point-to-Point Protocol (Multilink PPP) or Multilink Frame Relay.

17. The apparatus of claim 13, wherein each of the first device, the destination device, and the intermediate device is a packet switching device.

18. An apparatus, comprising:
a multilink bundled interface configured for communicating over each link of a plurality of bundled communication links between the apparatus and an intermediate device while appearing as a single logical link to upper layer protocols of the apparatus for communicating with the intermediate device with a bandwidth corresponding to an aggregate of the bandwidth of each of the plurality of bundled communications links;
a Bidirectional Forwarding Detection (BFD) manager configured to conduct a separate BFD session with a remote device, through the intermediate device, over each link of the plurality of bundled communication links between the apparatus and the intermediate device; and
a bundle manager configured to cause a particular link to be removed from the plurality of bundled communication links in response to detecting a failure with the particular link based on its respective said BFD session.

19. The apparatus of claim 18, wherein each of the apparatus, the intermediate device, and the remote device is a packet switching device.

20. An apparatus, comprising:
a multilink bundled interface configured for communicating over each link of a plurality of bundled communication links between the apparatus and an intermediate device while appearing as a single logical link to upper layer protocols of the apparatus for communicating with the intermediate device with a bandwidth corresponding to an aggregate of the bandwidth of each of the plurality of bundled communications links;
a Bidirectional Forwarding Detection (BFD) manager configured to conduct a separate BFD session with a remote device, through the intermediate device, over each link of the plurality of bundled communication links between the apparatus and the intermediate device; and
a bundle manager configured to cause the multilink bundled interface to be removed from service in response to detecting a failure on at least a predetermined number of said BFD sessions with the remote device.

21. The apparatus of claim 20, wherein the predetermined number is greater than one.

22. The apparatus of claim 20, wherein the predetermined number is the number of links in the plurality of bundled communication links between the apparatus and the destination device.

23. The apparatus of claim 20, wherein each of the apparatus, the intermediate device, and the remote device is a packet switching device.

* * * * *